United States Patent
Bender et al.

(10) Patent No.: US 9,225,727 B2
(45) Date of Patent: Dec. 29, 2015

(54) DATA SOURCE BASED APPLICATION SANDBOXING

(75) Inventors: Christopher Lyle Bender, Waterloo (CA); Van Quy Tu, Kitchener (CA); Daniel Jonas Major, Ottawa (CA); Jonathan Raymond Cardy, Guelph (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 13/074,136

(22) Filed: Mar. 29, 2011

(65) Prior Publication Data

US 2012/0124640 A1    May 17, 2012

Related U.S. Application Data

(60) Provisional application No. 61/413,846, filed on Nov. 15, 2010.

(51) Int. Cl.
*G06F 17/00* (2006.01)
*H04L 29/06* (2006.01)
*G06F 21/62* (2013.01)

(52) U.S. Cl.
CPC .......... *H04L 63/105* (2013.01); *G06F 21/6218* (2013.01)

(58) Field of Classification Search
CPC ....... H04L 63/10; H04L 63/101; H04L 63/20; G06F 21/121

USPC .................. 345/156; 358/1.15; 713/155, 156; 709/999.009, 229, 226, 217; 726/1, 24, 726/2, 9, 27; 707/8, 783
See application file for complete search history.

(56) References Cited

U.S. PATENT DOCUMENTS

| | | | |
|---|---|---|---|
| 4,945,556 A | 7/1990 | Namekawa | |
| 5,220,604 A | 6/1993 | Gasser et al. | |
| 5,432,934 A | 7/1995 | Levin et al. | |

(Continued)

FOREIGN PATENT DOCUMENTS

| | | |
|---|---|---|
| CA | 2757815 | 5/2012 |
| CN | 101523878 | 9/2009 |

(Continued)

OTHER PUBLICATIONS

United States Final Office Action for co-pending U.S. Appl. No. 13/098,456, dated Apr. 17, 2013.

(Continued)

*Primary Examiner* — Dustin Nguyen
(74) *Attorney, Agent, or Firm* — Integral Intellectual Property Inc.; Miriam Paton; Amy Scouten

(57) ABSTRACT

A computing device and a method for a computing device to control access to data stored on a data store of the device. An access component of the device having control over access to the data. The access component being operative to receive a request for data from a requesting component, identify an assigned access domain of the requesting component and an assigned data domain of the requested data and determine whether the requesting component is authorized to access the data by comparing the assigned access domain and the data domain with permissions specified in a security policy. If the assigned access domain is authorized to access the data domain, the access component may provide access to the requested data.

35 Claims, 11 Drawing Sheets

(56) References Cited

U.S. PATENT DOCUMENTS

| | | |
|---|---|---|
| 5,649,194 A | 7/1997 | Miller et al. |
| 5,708,812 A | 1/1998 | Van Dyke et al. |
| 5,864,765 A | 1/1999 | Barvesten |
| 5,987,440 A | 11/1999 | O'Neil et al. |
| 5,987,611 A | 11/1999 | Freund |
| 6,052,735 A | 4/2000 | Ulrich et al. |
| 6,070,244 A | 5/2000 | Orchier et al. |
| 6,081,898 A | 6/2000 | Miller et al. |
| 6,105,132 A * | 8/2000 | Fritch et al. ............... 713/167 |
| 6,173,404 B1 | 1/2001 | Colburn et al. |
| 6,178,505 B1 | 1/2001 | Schneider et al. |
| 6,223,291 B1 | 4/2001 | Puhl et al. |
| 6,233,446 B1 | 5/2001 | Do |
| 6,292,798 B1 | 9/2001 | Dockter et al. |
| 6,324,645 B1 | 11/2001 | Andrews et al. |
| 6,339,423 B1 | 1/2002 | Sampson et al. |
| 6,351,816 B1 | 2/2002 | Mueller et al. |
| 6,360,322 B1 | 3/2002 | Grawrock |
| 6,374,292 B1 | 4/2002 | Srivastava et al. |
| 6,405,202 B1 | 6/2002 | Britton et al. |
| 6,412,070 B1 | 6/2002 | Van Dyke et al. |
| 6,516,421 B1 | 2/2003 | Peters |
| 6,647,388 B2 * | 11/2003 | Numao et al. ................... 1/1 |
| 6,668,323 B1 | 12/2003 | Challener et al. |
| 6,757,821 B1 | 6/2004 | Akiyama et al. |
| 6,772,350 B1 | 8/2004 | Belani et al. |
| 6,785,810 B1 | 8/2004 | Lirov et al. |
| 6,886,038 B1 | 4/2005 | Tabbara et al. |
| 6,957,330 B1 | 10/2005 | Hughes |
| 6,978,385 B1 | 12/2005 | Cheston et al. |
| 7,200,869 B1 * | 4/2007 | Hacherl et al. ................ 726/27 |
| 7,246,374 B1 | 7/2007 | Simon et al. |
| 7,331,058 B1 | 2/2008 | Gladney |
| 7,400,878 B2 | 7/2008 | Hassan et al. |
| 7,574,200 B2 | 8/2009 | Hassan et al. |
| 7,856,654 B2 * | 12/2010 | Pouliot ........................... 726/1 |
| 7,869,789 B2 | 1/2011 | Hassan et al. |
| 7,926,086 B1 * | 4/2011 | Violleau et al. ................ 726/1 |
| 8,074,078 B2 | 12/2011 | Brown et al. |
| 8,510,818 B2 * | 8/2013 | Garg et al. ..................... 726/9 |
| 8,544,084 B2 | 9/2013 | Owen et al. |
| 8,661,531 B2 | 2/2014 | Owen et al. |
| 8,893,266 B2 | 11/2014 | Owen et al. |
| 2001/0023421 A1 | 9/2001 | Numao et al. |
| 2001/0047485 A1 | 11/2001 | Brown et al. |
| 2002/0013815 A1 | 1/2002 | Obradovich et al. |
| 2002/0019944 A1 | 2/2002 | Kou |
| 2002/0031230 A1 | 3/2002 | Sweet et al. |
| 2002/0083341 A1 | 6/2002 | Feuerstein et al. |
| 2002/0095414 A1 | 7/2002 | Barnett et al. |
| 2002/0095497 A1 | 7/2002 | Satagopan et al. |
| 2002/0099952 A1 | 7/2002 | Lambert et al. |
| 2002/0112155 A1 | 8/2002 | Martherus et al. |
| 2003/0005317 A1 | 1/2003 | Audebert et al. |
| 2003/0065676 A1 | 4/2003 | Gbadegesin et al. |
| 2003/0093698 A1 | 5/2003 | Challener et al. |
| 2003/0120948 A1 | 6/2003 | Schmidt et al. |
| 2003/0126437 A1 | 7/2003 | Wheeler et al. |
| 2003/0163685 A1 | 8/2003 | Paatero |
| 2003/0177389 A1 | 9/2003 | Albert et al. |
| 2004/0001101 A1 | 1/2004 | Trajkovic et al. |
| 2004/0128392 A1 | 7/2004 | Blakley et al. |
| 2005/0154935 A1 | 7/2005 | Jin |
| 2005/0213763 A1 | 9/2005 | Owen et al. |
| 2005/0223239 A1 | 10/2005 | Dotan |
| 2005/0251573 A1 * | 11/2005 | Merkow et al. ............. 709/226 |
| 2006/0059556 A1 | 3/2006 | Royer |
| 2006/0070114 A1 * | 3/2006 | Wood et al. ................... 726/2 |
| 2006/0129948 A1 | 6/2006 | Hamzy et al. |
| 2006/0156026 A1 | 7/2006 | Utin |
| 2006/0212589 A1 | 9/2006 | Hayer et al. |
| 2006/0230041 A1 * | 10/2006 | Sherwood ....................... 707/8 |
| 2006/0253894 A1 | 11/2006 | Bookman et al. |
| 2007/0073694 A1 * | 3/2007 | Picault et al. ................... 707/9 |
| 2007/0277127 A1 | 11/2007 | Carlson et al. |
| 2008/0034402 A1 * | 2/2008 | Botz et al. ......................... 726/1 |
| 2008/0081609 A1 | 4/2008 | Burgan et al. |
| 2008/0222711 A1 | 9/2008 | Michaelis |
| 2008/0317012 A1 * | 12/2008 | Singh ............................. 370/357 |
| 2009/0254753 A1 | 10/2009 | De Atley et al. |
| 2009/0271844 A1 * | 10/2009 | Zhang et al. ..................... 726/2 |
| 2010/0175104 A1 | 7/2010 | Khalid |
| 2010/0182230 A1 * | 7/2010 | Yamada et al. ............... 345/156 |
| 2010/0274910 A1 * | 10/2010 | Ghanaie-Sichanie et al. ............................. 709/229 |
| 2010/0299376 A1 | 11/2010 | Batchu et al. |
| 2010/0319053 A1 | 12/2010 | Gharabally |
| 2011/0145833 A1 | 6/2011 | De Los Reyes et al. |
| 2011/0185428 A1 * | 7/2011 | Sallam ............................. 726/24 |
| 2011/0275364 A1 * | 11/2011 | Austin et al. .................. 455/423 |
| 2011/0314401 A1 | 12/2011 | Pearson |
| 2012/0023573 A1 | 1/2012 | Shi |
| 2012/0054853 A1 | 3/2012 | Gupta et al. |
| 2012/0079267 A1 * | 3/2012 | Lee ............................... 713/156 |
| 2012/0079609 A1 | 3/2012 | Bender et al. |
| 2012/0144196 A1 | 6/2012 | Owen et al. |
| 2012/0202527 A1 | 8/2012 | Obradovich et al. |
| 2013/0166595 A1 * | 6/2013 | Meketa et al. ................ 707/783 |
| 2014/0171023 A1 | 6/2014 | Owen |

FOREIGN PATENT DOCUMENTS

| | | |
|---|---|---|
| EP | 0973350 | 1/2000 |
| EP | 2453631 | 5/2012 |
| WO | 0059225 | 10/2000 |
| WO | 2005045550 | 5/2005 |

OTHER PUBLICATIONS

United States Final Office Action and Examiner Initiated Interview Summary for co-pending U.S. Appl. No. 13/371,093, dated Apr. 24, 2013.

United States Amendment for co-pending U.S. Appl. No. 13/371,093, dated Apr. 15, 2013.

United States Notice to File Corrected Application Papers for co-pending U.S. Appl. No. 10/524,353, dated Apr. 12, 2013.

Extended European Search Report. European Application No. 11160321.3. Dated: Jul. 20, 2011.

Response. European Application No. 11160321.3. Dated: Nov. 20, 2012.

Co-pending U.S. Appl. No. 13/098,456, "Method for Establishing a Plurality of Modes of Operation on a Mobile Device", filed Apr. 30, 2011.

Office Action. Co-pending U.S. Appl. No. 13/098,456. Dated: Sep. 13, 2012.

Co-pending U.S. Appl. No. 10/524,353, "System and Method for Secure Control of Resources of Wireless Mobile Communication Devices", filed Feb. 14, 2005.

Office Action. Co-pending U.S. Appl. No. 10/524,353. Dated: May 30, 2008.

Amendment. Co-pending U.S. Appl. No. 10/524,353. Dated: Sep. 30, 2008.

Final Office Action. Co-pending U.S. Appl. No. 10/524,353. Dated: Dec. 10, 2008.

Amendment After Final. Co-pending U.S. Appl. No. 10/524,353. Dated: Feb. 10, 2009.

Advisory Action. Co-pending U.S. Appl. No. 10/524,353. Dated: Feb. 18, 2009.

Request for Continued Examination (RCE). Co-pending U.S. Appl. No. 10/524,353. Dated: Mar. 10, 2009.

Office Action. Co-pending U.S. Appl. No. 10/524,353. Dated: Apr. 8, 2009.

Amendment. Co-pending U.S. Appl. No. 10/524,353. Dated: Jul. 8, 2009.

Final Office Action. Co-pending U.S. Appl. No. 10/524,353. Dated: Nov. 12, 2009.

Amendment and Request for Continued Examination (RCE). Co-pending U.S. Appl. No. 10/524,353. Dated: Dec. 30, 2009.

Office Action. Co-pending U.S. Appl. No. 10/524,353. Dated: Feb. 2, 2010.

(56) References Cited

OTHER PUBLICATIONS

Amendment. Co-pending U.S. Appl. No. 10/524,353. Dated: Apr. 30, 2010.
Final Office Action. Co-pending U.S. Appl. No. 10/524,353. Dated: May 21, 2010.
Amendment After Final. Co-pending U.S. Appl. No. 10/524,353. Dated: Jul. 20, 2010.
Advisory Action. Co-pending U.S. Appl. No. 10/524,353. Dated: Jul. 23, 2010.
Notice of Appeal. Co-pending U.S. Appl. No. 10/524,353. Dated: Aug. 20, 2010.
Amendment and Appeal Brief. Co-pending U.S. Appl. No. 10/524,353. Dated: Jan. 20, 2011.
Notification of Non-Compliant Appeal Brief. Co-pending U.S. Appl. No. 10/524,353. Dated: Feb. 8, 2011.
Response to Notification of Non-Compliant Appeal Brief. Co-pending U.S. Appl. No. 10/524,353. Dated: Mar. 8, 2011.
Office Action. Co-pending U.S. Appl. No. 10/524,353. Dated: Apr. 29, 2011.
Amendment. Co-pending U.S. Appl. No. 10/524,353. Dated: Aug. 29, 2011.
Final Office Action. Co-pending U.S. Appl. No. 10/524,353. Dated: Oct. 20, 2011.
Amendment after Final. Co-pending U.S. Appl. No. 10/524,353. Dated: Dec. 20, 2011.
Advisory Action. Co-pending U.S. Appl. No. 10/524,353. Dated: Jan. 10, 2012.
Amendment and Request for Continued Examination (RCE). Co-pending U.S. Appl. No. 10/524,353. Dated: Apr. 20, 2012.
Office Action. Co-pending U.S. Appl. No. 10/524,353. Dated: Sep. 21, 2012.
Co-pending U.S. Appl. No. 13/371,093, "System and Method for Secure Control of Resources of Wireless Mobile Communication Devices", filed Feb. 10, 2012.
Smartphone Security Beyond Lock and Wipe (Jun. 10, 2010): http://www.enterprisemobiletoday.com/article.php/3887006.
Basic Access Authentication (Jan. 23, 2010): http://en.wikipedia.org/wiki/Basic_access_authentication.
Digital Access Authentication (Dec. 23, 2009): http://en.wikipedia.org/wiki/Digest_access_authentication.
Cross-site request forgery (Nov. 30, 2008): http://en.wikipedia.org/wiki/Cross-site_request_forgery.
"Customizing User Interaction in Smart Phones", Pervasive Computing, IEEE CS (2006) pp. 81-90 (URL: http://www.idi.ntnu.no/grupper/su/bibliography/pdf/2006/Korpipaa2006pc.pdf).
"Supporting Mobile Privacy and Security through Sensor-Based Context Detection", Julian Seifert, Second International Workshop on Security and Privacy in Spontaneous Interaction and Mobile Phone Use, May 17, 2010, Finland (URL: http://www.medien.ifi.lmu.de/iwssi2010/papers/iwssi-spmu2010-seifert.pdf).
EagleVision: A Pervasive Mobile Device Protection System, Ka Yang, Nalin Subramanian, Daji Qiao, and Wensheng Zhang, Iowa State University (URL: http://www.cs.iastate.edu/~wzhang/papers/eagleVision.pdf).
"Using context-profiling to aid access control decisions in mobile devices", Gupta et al., Nokia Research Center (URL: http://www.cerias.purdue.edu/assets/symposium/2011-posters/372-C48.pdf) Please refer to the 1-page file named 372-C48.pdf.
Newton, Harry, "Newton's Telecom Dictionary, 22nd Edition," 2006, CMP Books, p. 972.
Noting of loss of rights pursuant to Rule 112(1) EPC and Request for further processing. European Application No. 11160321.3. Dated: Dec. 3, 2012.
Noting of loss of rights pursuant to Rule 112(1) EPC. European Application No. 11160321.3. Dated: Dec. 5, 2012.
Decision on the request for further processing under Rule 135(3) EPC. European Application No. 11160321.3. Dated: Dec. 20, 2012.
Amendment. Co-pending U.S. Appl. No. 13/098,456. Dated: Dec. 13, 2012.
Amendment. Co-pending U.S. Appl. No. 10/524,353. Dated: Jan. 22, 2013.
Office Action. Co-pending U.S. Appl. No. 13/371,093. Dated: Jan. 14, 2013.
Menezes, Alfred J. et al. "Handbook of Applied Cryptography," 1997, CRC Press LLC, pp. 4, 24, 241, 322, 358-361, 492, 545.
Supplemental Amendment. Co-pending U.S. Appl. No. 10/524,353. Dated: Feb. 28, 2013.
Notice of Allowance. Co-pending U.S. Appl. No. 10/524,353. Dated: Mar. 8, 2013.
Request for Continued Examination (RCE). U.S. Appl. No. 13/098,456. Dated: Aug. 14, 2013.
Extension of Time. U.S. Appl. No. 13/098,456. Dated: Aug. 14, 2013.
Amendment. U.S. Appl. No. 13/098,456. Dated: Aug. 14, 2013.
Amendment. U.S. Appl. No. 13/371,093. Dated: Aug. 26, 2013.
Terminal Disclaimer. U.S. Appl. No. 13/371,093. Dated: Aug. 26, 2013.
Advisory Action. U.S. Appl. No. 13/371,093. Dated: Sep. 13, 2013.
Response After Final. U.S. Appl. No. 13/098,456. Dated: Jun. 13, 2013.
Advisory Action. U.S. Appl. No. 13/098,456. Dated: Jul. 1, 2013.
Amendment. U.S. Appl. No. 10/524,353. Dated: May 6, 2013.
Request for Continued Examination (RCE). U.S. Appl. No. 10/524,353. Dated: May 6, 2013.
Response to Notice to File Corrected Application Papers. U.S. Appl. No. 10/524,353. Dated: May 7, 2013.
Notice of Allowance. U.S. Appl. No. 10/524,353. Dated: May 29, 2013.
Interview Summary. U.S. Appl. No. 13/371,093. Dated: May 10, 2013.
3GPP ETSI TS 123 057 v3.3.0 (Oct. 16, 2000). 3rd Generation Partnership Project; Technical Specification Group Terminals; Mobile Station Application Execution Environment (MExE); Functional description; Stage 2 (Release 1999).
Response After Final. U.S. Appl. No. 13/371,093. Dated: Sep. 19, 2013.
Terminal Disclaimer. U.S. Appl. No. 13/371,093. Dated: Sep. 19, 2013.
Terminal Disclaimer Review Decision. U.S. Appl. No. 13/371,093. Dated: Sep. 24, 2013.
Response. European Patent Application No. 11160321.3. Dated: Mar. 6, 2014.
Final Office Action. U.S. Appl. No. 13/098,456. Dated: Apr. 10, 2014.
Response After Final. U.S. Appl. No. 13/098,456. Dated: Jun. 10, 2014.
Advisory Action. U.S. Appl. No. 13/098,456. Dated: Jul. 1, 2014.
Amendment. U.S. Appl. No. 13/098,456. Dated: Jul. 8, 2014.
Request for Continued Examination (RCE). U.S. Appl. No. 13/098,456. Dated: Jul. 8, 2014.
Preliminary Amendment. U.S. Appl. No. 14/188,345. Dated: Jun. 23, 2014.
Terminal Disclaimer. U.S. Appl. No. 14/188,345. Dated: Jun. 26, 2014.
Notice of Allowance. U.S. Appl. No. 14/188,345. Dated: Jul. 8, 2014.
Amendment after Notice of Allowance. U.S. Appl. No. 14/188,345. Dated: Jul. 11, 2014.
Response. U.S. Appl. No. 13/098,456. Dated: Dec. 27, 2013.
Office Action. Canadian Patent Application No. 2,757,815. Dated: Jan. 23, 2014.
Exam Report. European Patent Application No. 11160321.3. Dated: Nov. 19, 2013.
Office Action. U.S. Appl. No. 13/098,456. Dated: Sep. 27, 2013.
Notice of Allowance. U.S. Appl. No. 13/371,093. Dated: Oct. 10, 2013.
Interview Summary. U.S. Appl. No. 13/371,093. Dated: Oct. 10, 2013.
Office Action. U.S. Appl. No. 13/098,456. Dated: Jan. 15, 2015.
Response to Rule 312 Communication. U.S. Appl. No. 14/188,345. Dated: Sep. 4, 2014.
Office Action. Canadian Patent Application No. 2,757,815. Dated: Sep. 29, 2014.
Schwartz, First Office Action for U.S. Appl. No. 14/543,324, mailed Jul. 31, 2015.

\* cited by examiner

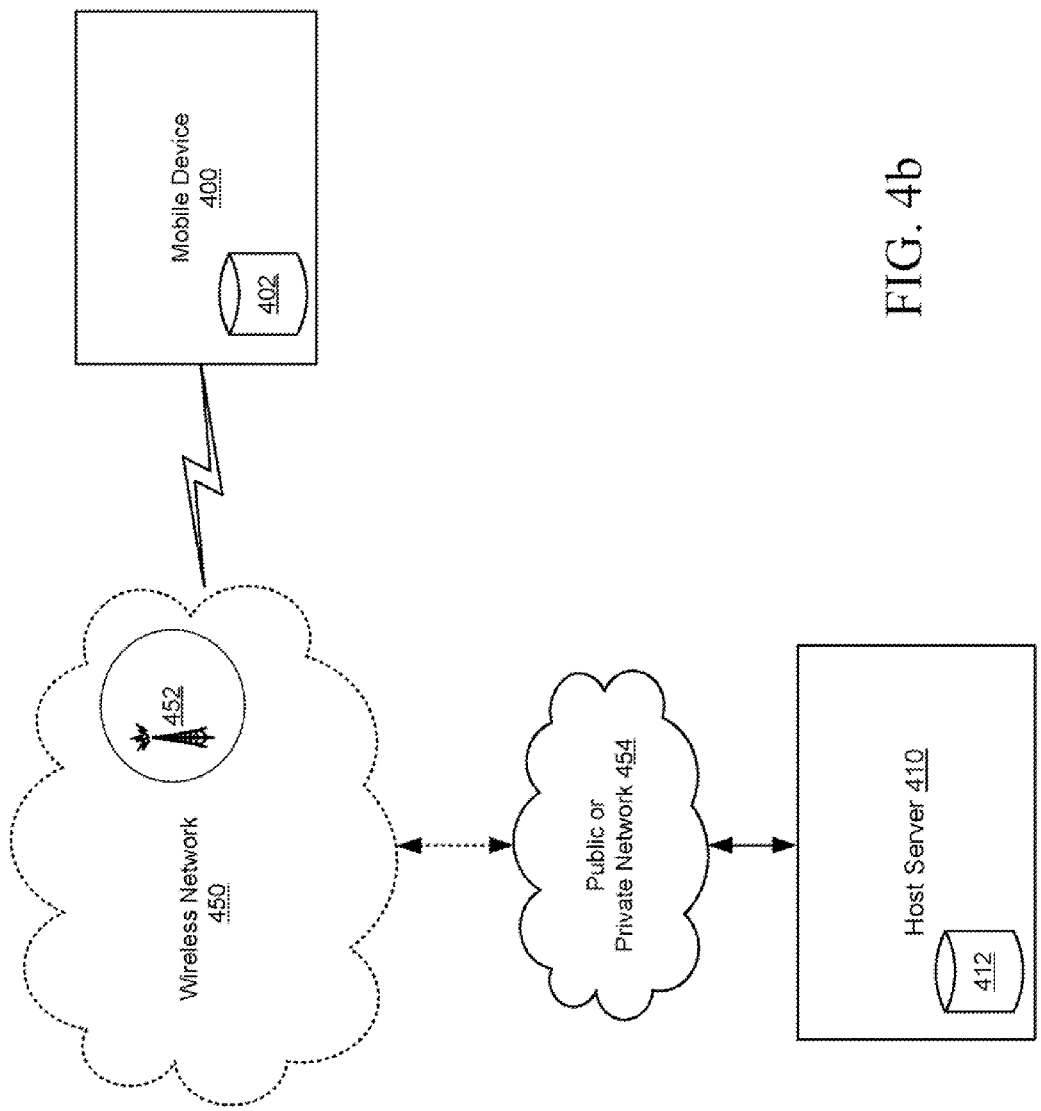

DATA SOURCE BASED APPLICATION SANDBOXING

FIELD OF THE INVENTION

This invention relates to protecting information stored on a computing device. In particular, this invention relates to controlling the accessibility of data stored on a computing device.

BACKGROUND OF THE INVENTION

Computing devices may be used for a variety of applications. While some applications may generate and store sensitive data, other applications may create innocuous or less sensitive data. In some instances, an application may generate sensitive data in some instances and less sensitive data in other instances.

There is a need for a device and method for protecting data that avoids the limitations in the prior art.

BRIEF DESCRIPTION OF THE DRAWING

In drawings which illustrate by way of example only a preferred embodiment of the invention.

FIG. 4b is a block diagram illustrating an embodiment of a system.

DETAILED DESCRIPTION OF THE INVENTION

Figure 1:
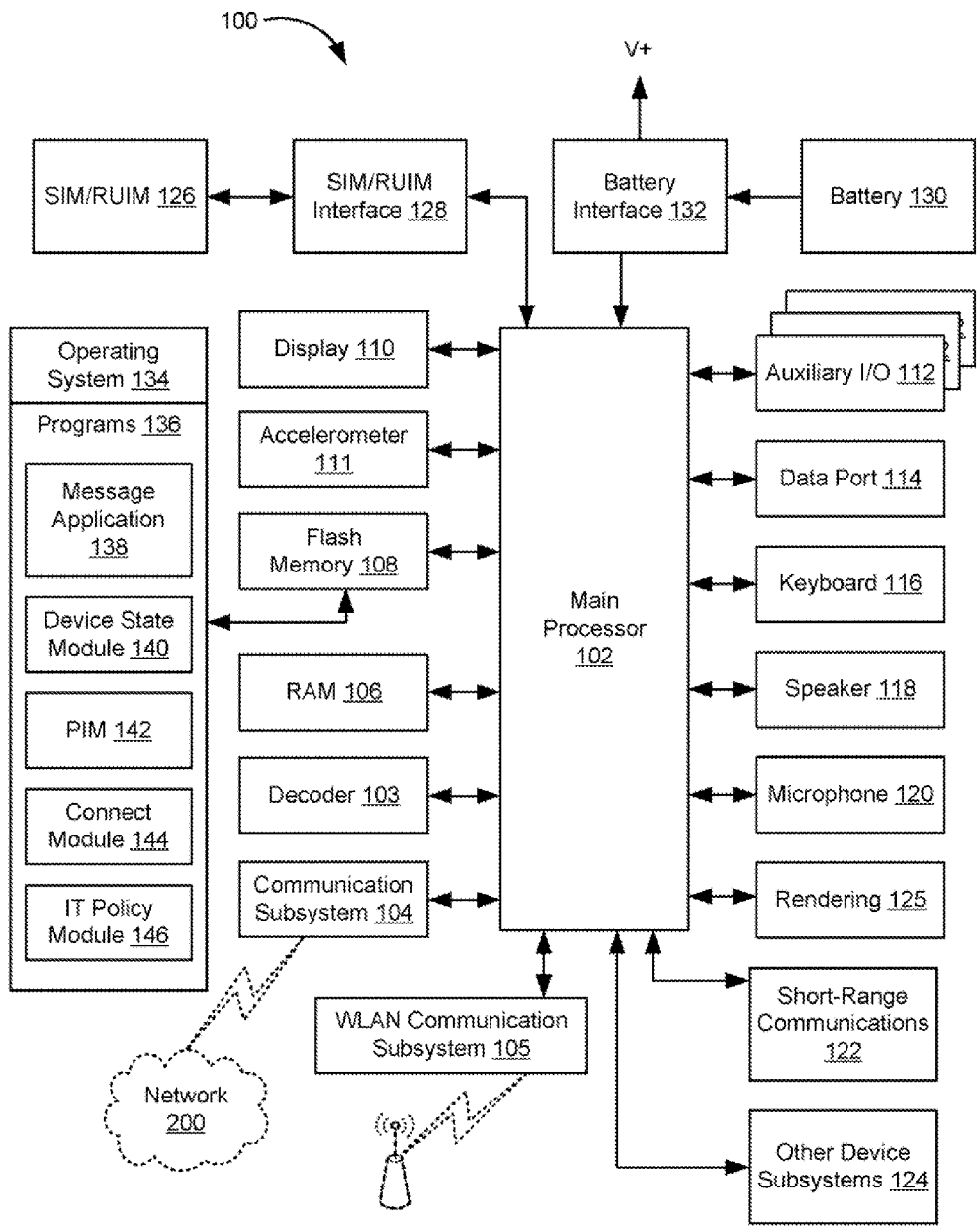
FIG. 1 is a block diagram of an embodiment of a mobile device.

In an embodiment, a method is provided for a computing device controlling access to data stored on a data store of the computing device, an access component of the computing device having control over access to the data, the method comprising the access component: receiving a request for data from a requesting component; identifying an assigned access domain of the requesting component and an assigned data domain of the requested data based on a security policy; determining whether the requesting component is authorized to access the data by comparing the assigned access domain and the assigned data domain with permissions specified in a security policy; and, if the assigned access domain is authorized to access the assigned data domain, providing access to the data.

In an aspect of the method, the providing access may comprise any one of: forwarding the requested data to the requesting component, writing an amendment specified by the forwarding component to the requested data and storing the amended data in place of the requested data in the data store, or deleting the requested data from the data store.

In an aspect of the method the identifying the assigned data domain of the data may comprise evaluating one or more data characteristics of the data and identifying the assigned data domain based on the one or more data characteristics and the security policy.

In an aspect of the method, the one or more data characteristics may comprise a data domain identifier associated with the data, and the evaluating comprises retrieving the data domain identifier and matching the retrieved data domain identifier with a corresponding assigned data domain specified in the security policy.

In an aspect of the method, the data may comprise a data object accessible to the access component and the evaluating one or more data characteristics may comprise the access component accessing the data object and analysing the data object to evaluate a content of the data object and comparing the content with data classifications defined in the security policy to identify the assigned data domain.

In an aspect of the method, the identifying the assigned access domain of the requesting component may comprise receiving an access domain identifier from the requesting component and matching the received access domain identifier with a corresponding assigned access domain specified in the security policy to identify the assigned access domain.

In an aspect of the method, before the access component receives the request, the access component may classify the data to assign a data domain by: evaluating data characteristics of the data; comparing the data characteristics with data classifications defined in the security policy to assign a data domain; and, storing the data in the data store associated with the data domain. The identifying the assigned data domain may comprise evaluating the data domain stored in association with the data, and comparing the data domain with data classifications defined in the security policy to identify the assigned data domain.

In an aspect of the method, the computing device may receive an updated security policy from a server over a network connection and the computing device may replace the security policy with the updated security policy such that operations of the access component that were based on the security policy become based upon the updated security policy.

In an aspect of the method, the computing device may receive an updated security policy from a server over a network connection, and the identifying may comprise identifying the assigned access domain of the requesting component and the assigned data domain of the requested data based upon the updated security policy, and the comparing may comprise comparing the assigned access domain and the assigned data domain with updated permissions specified in the updated security policy.

In an embodiment, a computing device may be provided, the computing device operative to control access to data stored on a data store of the device, the computing device comprising: a processing unit in communication with the data store; a requesting component operative on the device to request data stored in the data store; an access component operative on the device to: control access to data stored in the data store; receive requests for data from the requesting component; identify an assigned access domain of the requesting component and an assigned data domain of the data based on a security policy; determine whether the requesting component is authorized to access the data by comparing the assigned access domain and the assigned data domain with permissions specified in the security policy; and, provide access to the data if the assigned access domain is authorized to access the assigned data domain.

In an aspect of the computing device, the access component may be operative to identify the assigned data domain of the requested data by evaluating one or more data characteristics of the data and identifying the assigned data domain based on the one or more data characteristics and the security policy.

In an aspect of the computing device, the one or more data characteristics may comprise a data domain identifier associated with the data, and the access component may be operative to evaluate by retrieving the data domain identifier and matching the retrieved data domain identifier with a corresponding assigned data domain specified in the security policy.

In an aspect of the computing device, the data may comprise a data object and the access component may be operative to access the data object accessible to the access component and to evaluate the one or more data characteristics by accessing the data object and analysing the data object to evaluate a content of the data object and compare the content with data classifications defined in the security policy to identify the assigned data domain.

In an aspect of the computing device, the access component may be operative to identify the assigned access domain of the requesting component when the access component receives an access domain identifier from the requesting component by matching the received access domain identifier with a corresponding assigned access domain specified in the security policy to identify the assigned access domain.

In an aspect of the computing device, the access component may be operative to classify the data to assign a data domain before the access component receives the request, by: evaluating data characteristics of the data; comparing the data characteristics with data classifications specified in the security policy to assign a data domain; and, storing the data in the data store associated with the data domain.

In an aspect of the computing device, the access component may be operative to identify the assigned data domain by evaluating the data domain stored in association with the data, and comparing the data domain with data classifications defined in the security policy to identify the assigned data domain.

In an aspect the computing device may further comprise a network communications subsystem, the computing device may be operative to receive an updated security policy from a server through the network communications subsystem, and the access component is further operative to replace the security policy with the updated security policy such that operations of the access component that were based on the security policy become based upon the updated security policy.

In an aspect the computing device may be operative to receive an updated security policy from a server over a network connection, and the identifying may comprise identifying the assigned access domain of the requesting component and the assigned data domain of the requested data based upon the updated security policy, and the comparing may comprise comparing the assigned access domain and the assigned data domain with updated permissions specified in the updated security policy.

Figure 2:
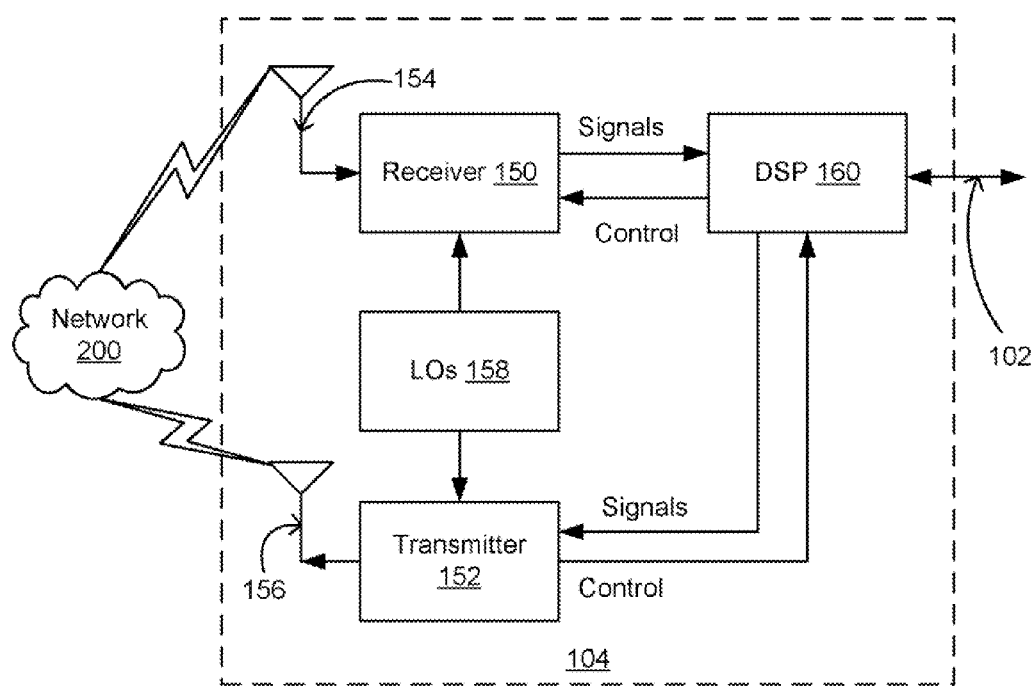
FIG. 2 is a block diagram of an embodiment of a communication subsystem component of the mobile device of FIG. 1.
Figure 3:
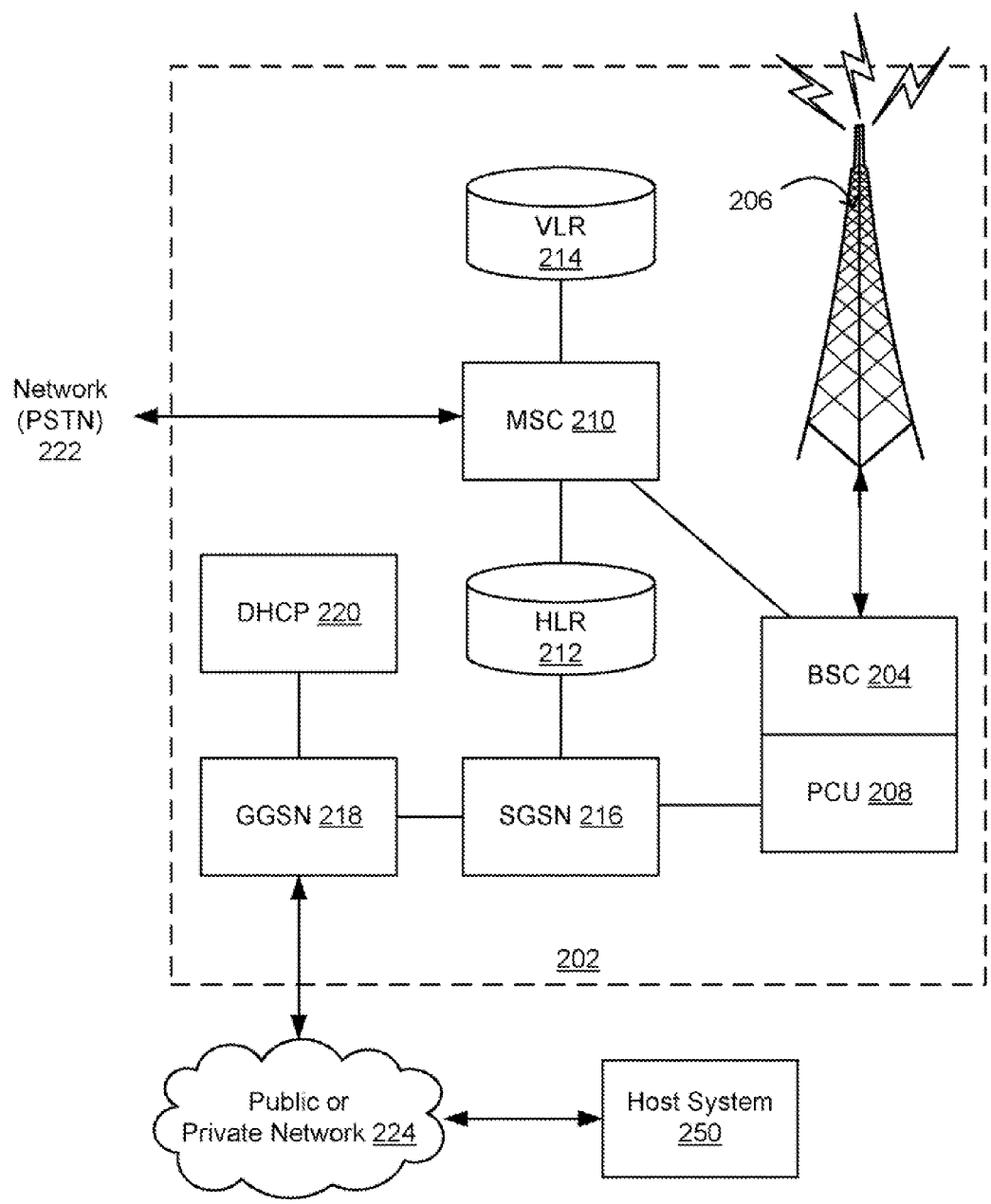
FIG. 3 is an exemplary block diagram of a node of a wireless network for use with the mobile device of FIG. 1.
Figure 4A:
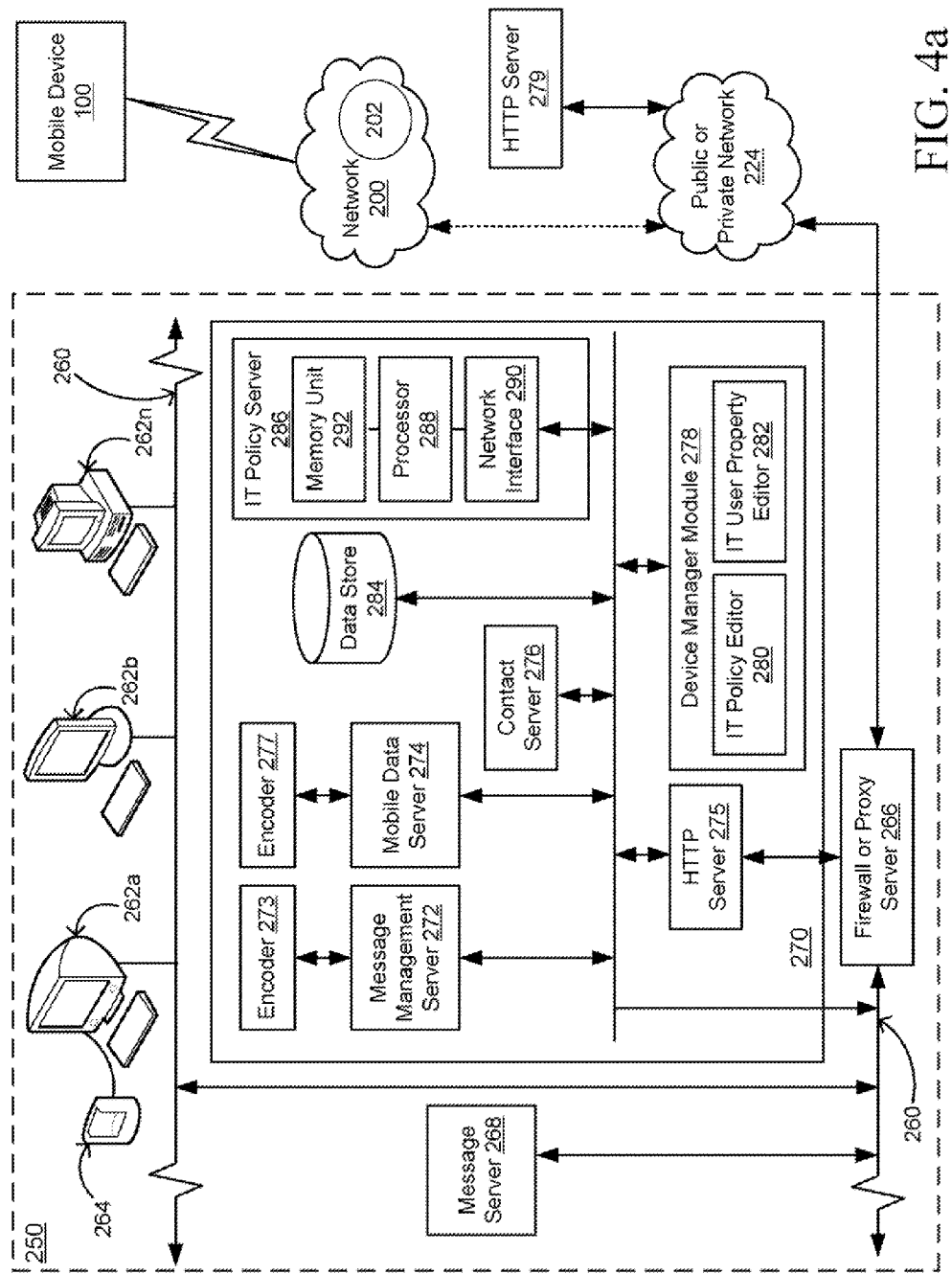
FIG. 4a is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4a. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of which the device 100.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) or another suitable identity module to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system. Some or all of the data items stored at the communication device 100 may be indexed for searching on the device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system or with other systems accessible over the network 200. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods. Other communication subsystems, such as the WLAN communication subsystem 105 shown in FIG. 1, may be provided with similar components as those described above configured for communication over the appropriate frequencies and using the appropriate protocols.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4A is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4A for ease of exposition, and it will be understood by persons skilled in the art that the host system 250 will comprise additional components that are not explicitly shown in FIG. 4A for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282.

The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection may be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262*a* can request the e-mail messages associated with that user's account stored on the data store associated with the message server 268. These messages are then retrieved from the data store and stored locally on the computer 262*a*. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as an File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

In an embodiment, a computing device 100 may be provided that is operative to categorise and assign data based upon a characteristic of the data into a security classification or data domain. In an aspect, the device 100 may be operative to control access to the stored data and limit access to requesting components assigned to an access domain that has permission to access the data domain assigned to the requested data. The data domains, access domains and permissions may be defined by a security policy.

In an embodiment, a system may be provided whereby an external server, such as a server in host system 250, may set the security policy to control access to data used on computing devices such as mobile device 100. In an aspect, a user of the computing device may set or modify the security policy.

In an aspect, the classification and access to data is controlled by one or more access components operative on the computing device. The access components may each be responsible for a specific class or type of data stored on the computing device and operative to access and modify that type of data.

Referring to FIG. 4b, in an embodiment a host server 410, such as a server within host system 250, may comprise a host data store 412. The host server 410 may be connected through a public or private network 454, such as a corporate LAN or the Internet, to a wireless network 450 which may include one or more network nodes 452. A mobile computing device 400, such as mobile device 100, in communication with the wireless network 450 may receive the security policy through the wireless network 450 from the host server 410 and store the security policy, or security information from the security policy, in a device data store 402. The security policy, or security information from the security policy, may define data domains, access domains and corresponding permissions for the access domains. In an aspect, the security policy may further specify data domains in terms of data classifications to allow a comparison of data characteristics of a specific data item with the data classifications to assign a data domain to the specific data item. In an aspect, the data item may comprise a data object, and the data classifications may identify characteristics of content within the data object to define and assign a data domain to the data object.

The permissions may grant access rights and levels of access to requesting components assigned to each access domain. At least one access component having control over the stored data, may allow access to the stored data by evaluating the access domain of a requesting component, evaluating the data domain of the requested data based upon a security policy in force at the time of request to identify an assigned access domain and an assigned data domain. The access component may further determine whether the requesting component is authorized to access the requested data by comparing the assigned access domain and the assigned data domain with permissions specified or defined in the current security policy. The current security policy may further place conditions or rights of access to a requesting component of an assigned access domain requesting access to data of an assigned data domain.

In an embodiment, the security policy sent by the host server 410 may be updated and an updated security policy sent to the computing device 400. The access components of the computing device 400 may use the updated security policy in place of the security policy, allowing the host server 410 to specify changes to permissions of access domains to access data domains.

In an aspect, the computing device 400 may compare data characteristics of data stored in a data store of the computing device 400 with the updated security policy such that rights of access may change based upon both the current content of the data and the updated security policy.

In an embodiment, the computing device 400 may employ access components, such as applications running on the device that are operative to control access to data stored on the device 400. The access components may each classify data handled by that filing component according to data characteristics and assign the classified data to the data domains specified in the security policy. The access component may store the classified data in one or more data stores accessible to, and in some embodiments under the sole control of, the access component. In an aspect, the data stores may be resident on the computing device 400. In an aspect, the data stores may be accessible by the computing device over a network connection, such as a corporate data store maintained in host system 250.

The access components may, in an embodiment, be further operative to control access to the classified data by requiring requesting components operating on the device 400 that request data controlled by the access component to comply with the current security policy. In an aspect, the access components may require a requesting component to be authorized to access data by evaluating an access domain assigned to the requesting component by the current security policy.

For instance, trusted components may be assigned by the security policy to access domains that allow access and full control over sensitive information that has been assigned to a restricted data domain. Third party components, which may be untrusted, may be assigned to access domains that limit access to data domains of public or common data of low-sensitivity or a data domain for data created by or downloaded by the third party component. The security policy may provide further control by setting a level of access to an access domain-data domain combination that limits what actions a requesting component can take with respect to the requested data. For instance, in an aspect, a requesting component may be granted read access but not write access to a data domain.

Figure 5A:
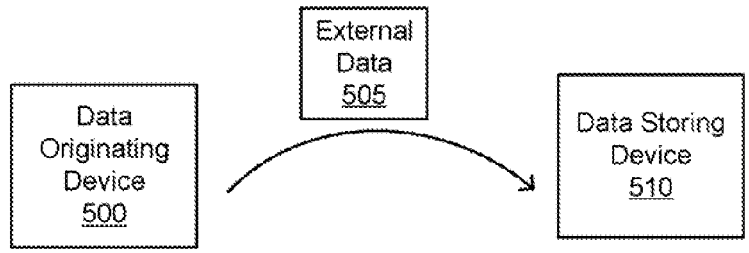
FIG. 5a-c are block diagrams illustrating embodiments of an access component storing data.

Referring to FIG. 5a, in an aspect, a data originating device 500 may send external data 505 to data storing device 510 such as device 100. The external data 505 may have a data domain assigned by the data originating device 500 that is communicated as domain data to the data storing device 510 along with the external data 505. In an embodiment, the domain data may comprise meta data of the external data 505.

Figure 5B:
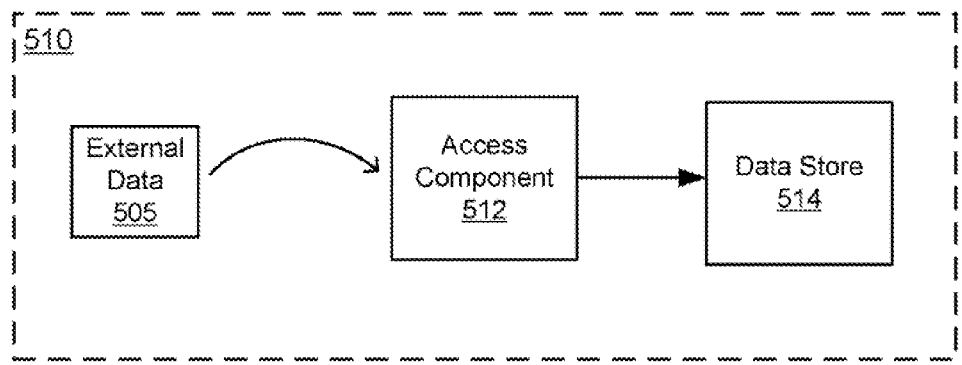

Referring to FIG. 5b, the external data 505, and domain data, are passed within device 510 to an access component 512. The access component 512 may comprise an application that is assigned control over, and is operative to access and process, a type of data stored in data store 514 on data storing device 510. Access component 512 receives the external data 505 and domain data, evaluates the domain data and stores the external data 505 in data storage 514, associated with the data domain. The access component 512 may further process the external data 505 before storing the processed data associated with the data domain in place of the external data 505.

An example of an access component 512 may include an address book application for storing contact information or, a mail program for receiving, generating, sending and storing mail messages, for instance. The applications maintain control over a specific data type, stored and organised by the applications. In this aspect, the processing may comprise, for instance, converting the external data 505 from a first data type into a second data type, adding data to an existing entry stored in application data store 514 or deleting amending data from an existing entry stored in application data store 514.

In embodiments where the data originating device 500 does not assign a data domain to the external data 505, access component 512 may associate a data domain based upon a security policy as applied to data characteristics of the external data 505. The data characteristics may include, for instance, such factors as: an identity of the data originating device 500, a source of the data, a data type of the data, a user classification, a content of the data or other data characteristics. In an aspect, the data storing device 510 may solicit input from a user of the device to assign a data domain to the external data 505. The choice of data domains presented to the user may be defined by a security policy, wherein characteristics of the external data 505 are evaluated by the access component 512, in consultation with the security policy to identify a selection of data domains to be presented to the user for selection. In an aspect, the access component may be operative to access the external data 505, and evaluate content of the external data 505 to classify the external data 505 to a data domain.

Figure 7A:
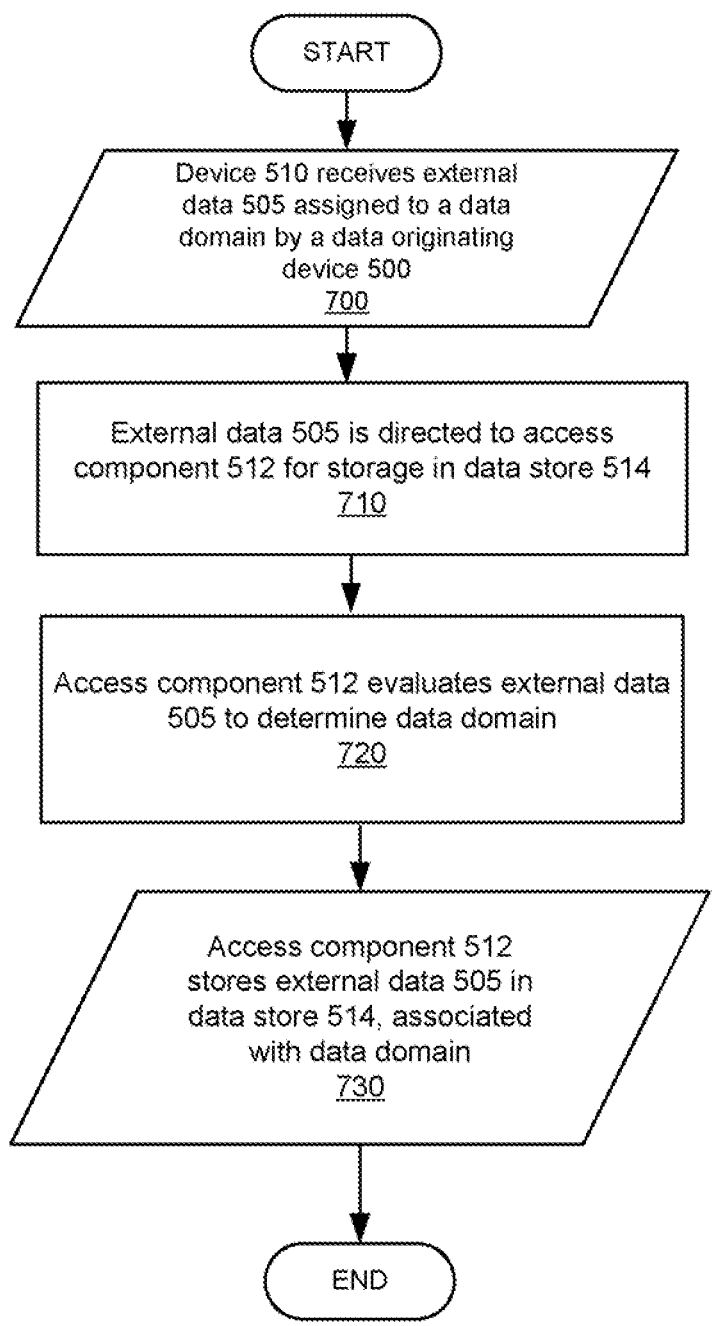
FIG. 7a-b are flow diagrams illustrating embodiments an access component storing data.

Referring to FIG. 7a, an embodiment of the operation of the access component 512 for filing external data 505 may start when device 510 receives external data 505 and domain data assigning the external data 505 to a data domain from a data originating device 500 in step 700. The device 510 directs the external data 505 to access component 512 for storage in a data store 514 in step 710. Access component 512 may comprise a filing system, an API or application, for instance, that has control over access to data stored in data store 514. Access component 512 evaluates the external data 505 to determine a data domain of the external data 505 in step 720. In an aspect, the evaluation may comprise comparing a data domain identifier sent with the external data 505 with data classifications specified in the security policy to associate the external data 505 with the data domain. In an aspect, the access component 512 may be operative to associate a data domain to data that has not already been assigned to a data domain by comparing data characteristics of the external data 505 with data classifications specified in the security policy. Access component 512 stores the external data 505 in data storage 514, associated with the data domain in step 730. The access component 512 may associate the data domain by, for instance, storing the external data 505 within a portion of data storage 514 allocated to the domain; attaching a flag, pointer, meta data or identifier to the stored data; maintaining a table or database identifying data by domain, or other known means of preserving an association.

Figure 5C:
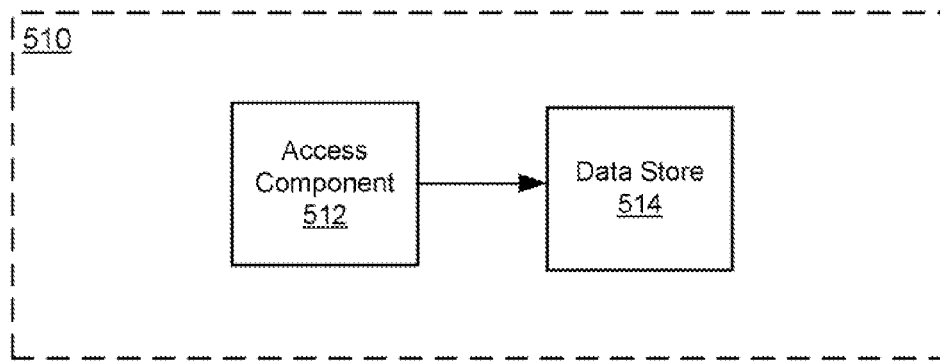

Data that has not been associated with a data domain by a data originating device 500, or a data generating component operating on the data storing device 510, may also be associated with a data domain by the access component. Referring to FIG. 5c, an access component 512, such as an application generating or controlling data, may generate or receive data to be stored in data store 514. For instance, an address book application may generate or receive address book information to be stored in the address book maintained in data store 514. The access component 512 may evaluate data characteristics of the data, compare the data characteristics with data classifications specified in the security policy and associate the data with a data domain. In an aspect, the data classifications may specify a source of the data, a data type of the data, a user classification, or keywords as specified in a content of the data. The data may then be stored in data store 514 associated with the data domain.

Figure 7B:
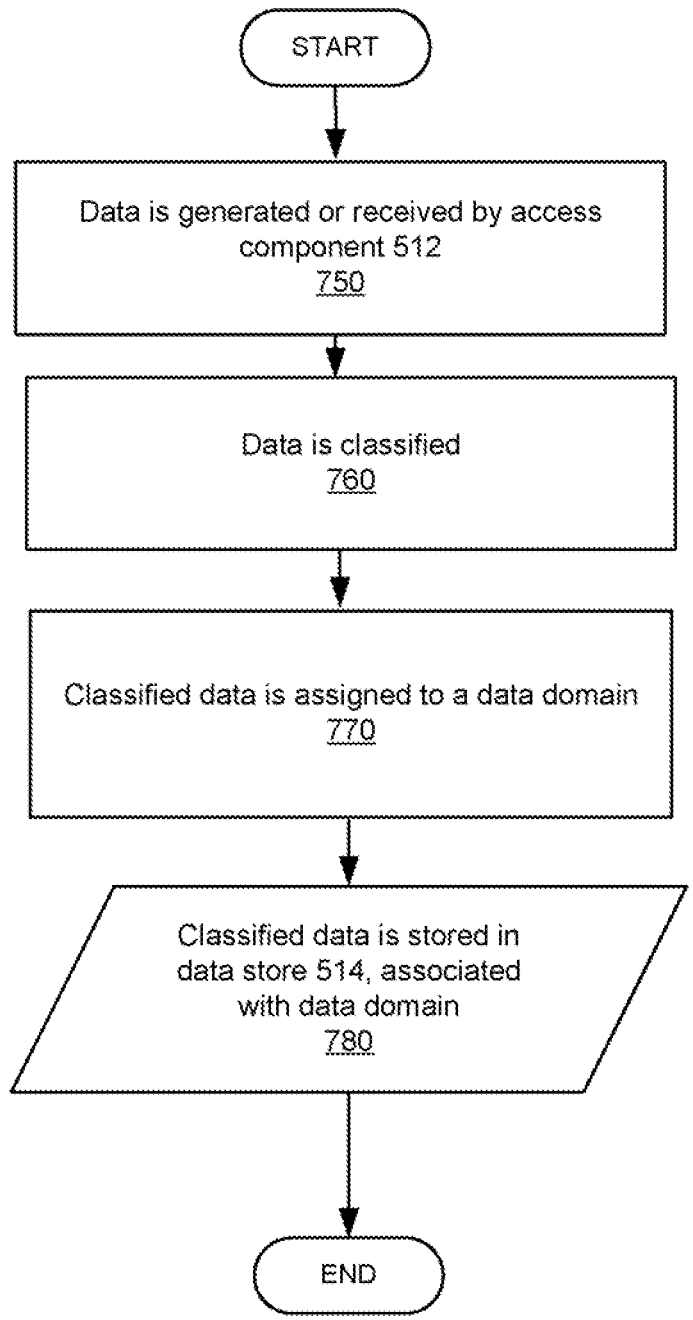

Referring to FIG. 7b, in an embodiment, the access component 512 may generate or receive data to be stored in step 750. The access component 512 may classify the data according to a set of criteria in accordance with a policy in step 760. In an aspect, the classification may comprise comparing data characteristics of the data with data classifications specified in the security policy. The classified data may be associated with a data domain in accordance with the security policy in step 770. The classified data may be stored in the data store 514, associated with the data domain in step 780.

Figure 6A:
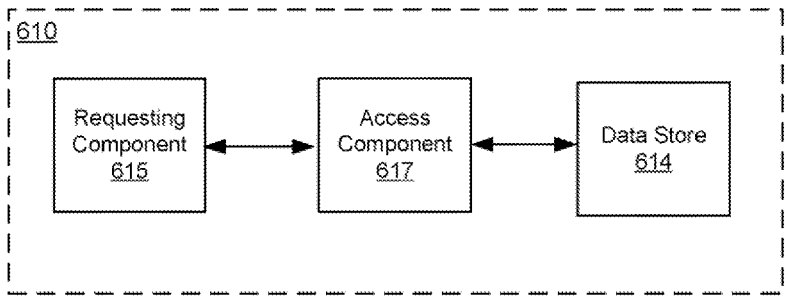
FIG. 6a-b are block diagrams illustrating embodiments of a requesting component requesting access to data controlled by an access component.

In an embodiment, stored data may be retrieved by device components that have permission to access the data domain assigned to the stored data based upon a current security policy maintained on the computing device. Referring to FIG. 6a, computing device 610 may include a requesting component 615, access component 617 and a data store 614 controlled by the access component 614.

Requesting component 615 may comprise, for instance, an application operating on the device or a subsystem of the device that requires data to service a request. Access component 617 may comprise, for instance an application that is assigned control over, and is operative to access and evaluate, a data type stored in data store 614.

Figure 8A:
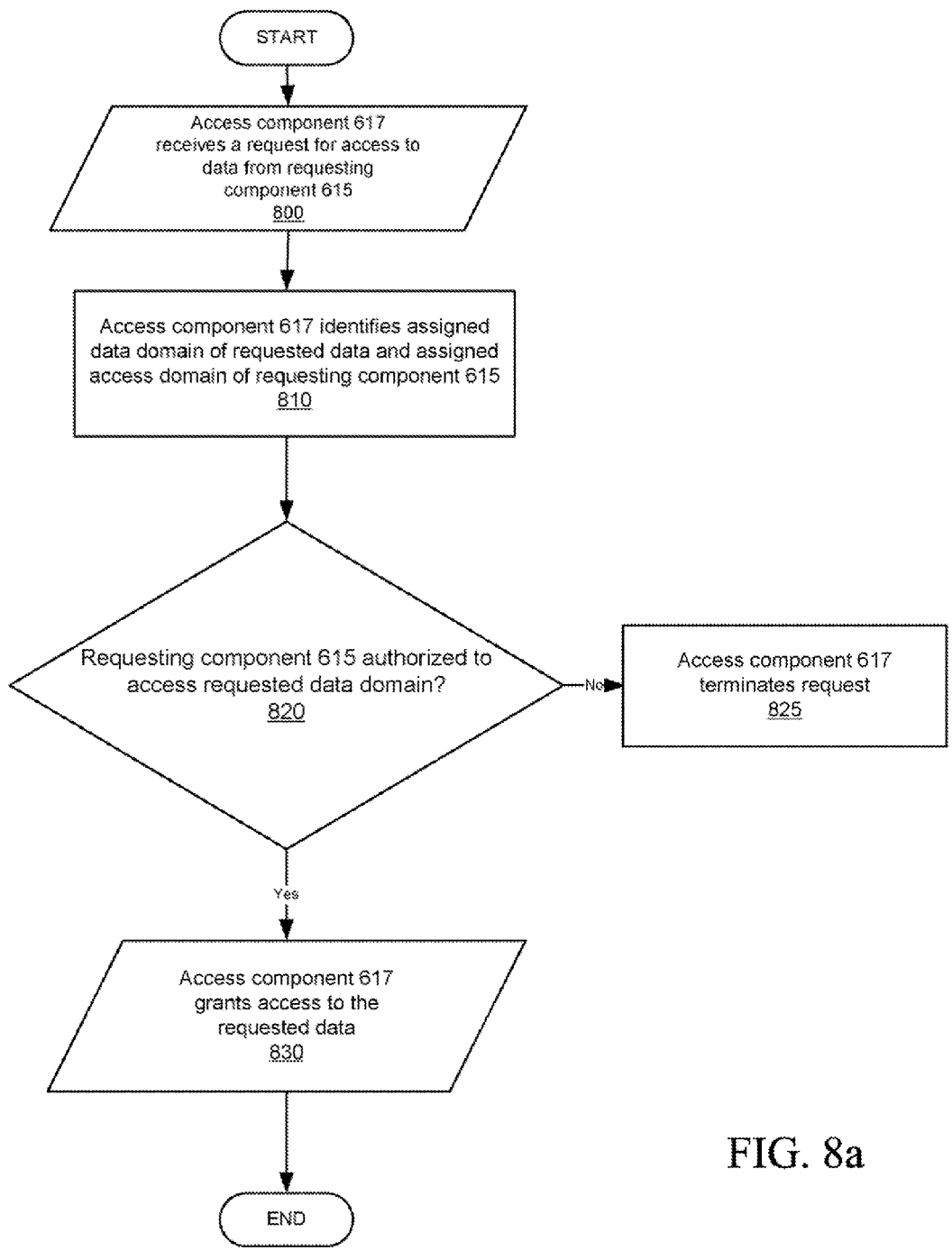
FIG. 8a-b are flow diagrams illustrating embodiments of an access component granting access to requested data.

Referring to FIG. 8a, in an embodiment, access component 617 may receive a request for data from data store 614 controlled by access component 617 from the requesting component 615 in step 800. The request may include an access domain assigned to the requesting component 615, or may include a component identifier that may be used by the access component 617 to assign an access domain as specified in the current security policy. In an embodiment, the access component 617 may maintain a record of components and their assigned domains, for instance as a look-up table or database. The record may be updated by the access component 617 based upon security information obtained from the security policy. In an embodiment, the record of components and their assigned domains may be specified in a current security policy accessible by the access component 617 at the time the request is serviced.

Access component 617 identifies the assigned access domain of the requesting component 615 and the assigned data domain of the requested data in step 810. In an embodiment, access component 617 may access data store 614 to determine the data domain associated with the requested data and then consult the current security policy to obtain the assigned data domain. In embodiments where access component 617 preserves an association of the data domain, access component 617 may determine the data domain based upon the association.

For instance, the access component 617 may consult a look-up table or database, read a data domain identifier associated with the requested data or identify a data domain associated with a portion of memory in data store 614 that contains the requested data to determine the associated data domain.

In an embodiment, the access component 617 may evaluate one or more data characteristics of the requested data and compare the one or more data characteristics with data classifications specified in the current security policy. The access component 617 may assign an assigned data domain based upon the evaluation and comparison.

Access component 617 then determines whether to grant access to the requested data by comparing the assigned access domain of the requesting component 615 and the assigned data domain with permissions specified in the current security policy to determine if the requesting component 615 is authorized to access the requested data in step 820. If the requesting component 615 is not authorized to access the requested data, the access component 617 terminates the request in step 825, optionally by returning an error notification. If the requesting component 615 is authorized to access the requested data, the access component 617 grants access to the requested data in step 830.

The determining whether to grant access may further comprise determining a specific right of access as defined in the security policy. For instance, the access component 617 may grant access and forward the requested data to the requesting component 615, write an amendment specified by the requesting component 615 to the requested data and storing the amended data in place of the requested data in the data store 614 or deleting the requested data from the data store 614.

Figure 6B:
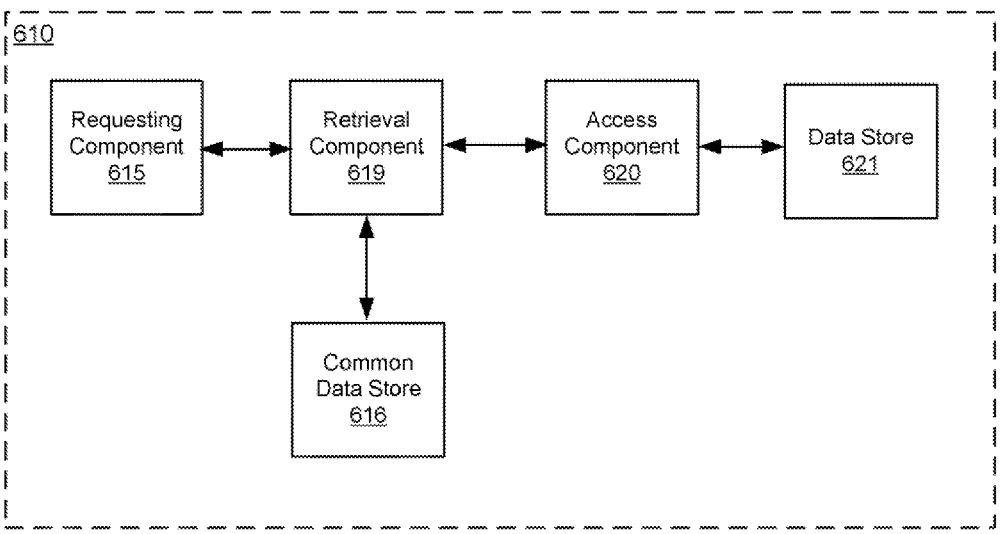

Referring to FIG. 6b, in an embodiment, retrieval component 619 may comprise an intermediary between a requesting component 615 and an access component 620 that controls data store 621. As indicated in FIG. 6b, retrieval component 619 may further control access to a common data store 616 that may store data from various applications. Retrieval component 619 may control access to the common data store 616 in the conventional manner of computing devices, or may itself operate as an access component 617. Common data store 616 may comprise a shared portion of memory along with data store 621, or may comprise a separate memory such as flash memory on the computing device 610 or removable flash memory on the computing device 610.

In the embodiment of FIG. 6b, requesting component 615 directs its request for data to retrieval component 619. Requesting component 615 may or may not include in its request a component identifier or an access domain identifier identifying the requesting component 615 or the access domain of the requesting component 615 respectively.

Retrieval component 619 may interface with more than access component 620, though in the embodiment of FIG. 6b only a single access component 620 is illustrated, along with common data store 616. Where the request for data involves data under the control of retrieval component 619, for instance common data store 616, retrieval component 619 handles the request directly and may grant access as specified above.

Where the request for data involves data under the control of access component 620, retrieval component 619 forwards the request, and any component identifier or access domain identifier, to access component 620. In an embodiment, retrieval component 619 may classify the requesting component 615 against a current security policy, and assign an access domain to the requesting component 615 and forward an assigned access domain identifier to the access component 620. Access component 620 receives the request and evaluates any component identifier, access domain identifier or assigned access domain identifier received with the data domain and the current security policy to determine whether the requesting component 615 is authorised to access the requested data.

Figure 8B:
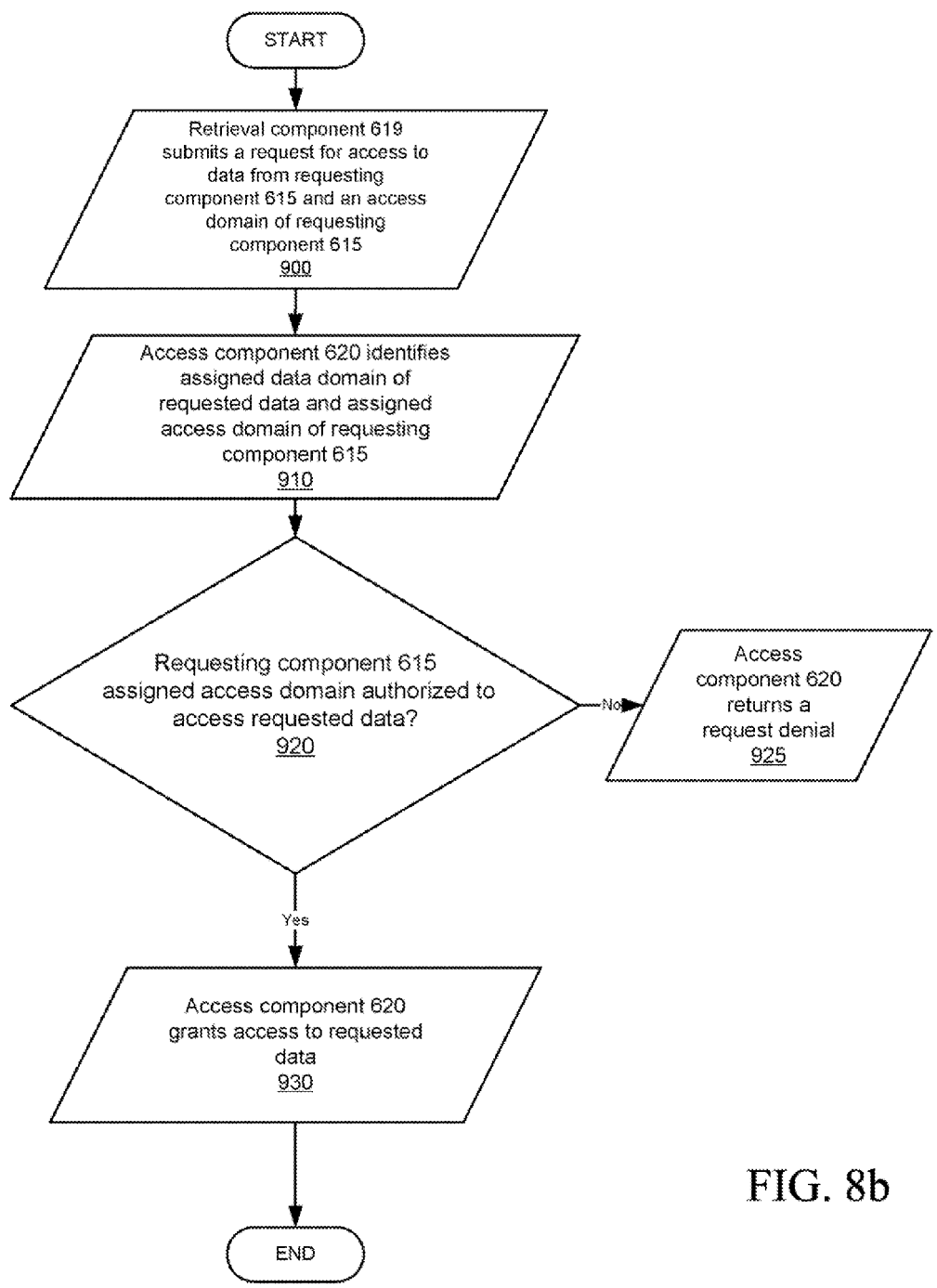

Referring to FIG. 8b, the access component 620 may receive a request for data submitted by the retrieval component 619 along with a component identifier, access domain identifier or assigned access domain identifier of the requesting component 615 in step 900. Access component 620 identifies an assigned data domain of the requested data and an assigned access domain of the requesting component 615 in step 910. Access component 620 may identify the assigned access domain by comparing the component identifier, access domain identifier or assigned access domain identifier, with security information in the current security policy to identify the assigned access domain. In an aspect, the current security policy may comprise an updated security policy that may differ from the security policy used to define the access domain identifier, and the access component 620 may consult the updated security policy to identify the assigned access domain that may differ from the access domain identified by the access domain identifier.

Access component 620 evaluates the assigned data domain and the assigned access domain based on the current security policy to determine whether the requesting component 615 is authorised to access the requested data in step 920. If the requesting component 615 is not authorised to access the requested data, the access component 620 may terminate the request and optionally return a request denial to the requesting component 615 in step 925. If the requesting component 615 is authorised to access the requested data, the access component 620 may grant access to the requested data in step 930. The granted access may, for instance, include forwarding the requested data to retrieval component 615, writing an amendment specified by the requesting component 615 to the requested data and storing the amended data in place of the requested data in the data store 621 or deleting the requested data from the data store 621.

Referring to FIG. 4b, in an embodiment, a system may be provided whereby a host server 410, such as a server in host system 250, may set a security policy to control access to data used on computing devices such as computing device 400. The server may forward the security policy to the computing device 400, the security policy defining data domains, access domains and corresponding permissions for granting access to data stored on, or accessible by, the computing device 400. The security policy may define the data domains by specifying data classifications that identify and correlate data content with each of the data domains. The computing device 400, in implementing the security policy, may employ access components 512 617 620, such as applications running on the device that are operative to access and evaluate specific types of data, to classify the data handled by each application and assign the classified data to the data domains specified in the security policy.

In an aspect, the host server 410 may be operative forward an updated security policy to the computing device 400. The updated security policy replacing an existing security policy being applied by the computing device 400 to grant access to data stored on the computing device 400.

Access components 512 617 620 may consult the updated security policy to grant access to data under their control. The updated security policy may, for instance, specify data classifications or data characteristics associated with a particular data domain such that the definition of a data domain changes. The updated security policy may further change access permissions granted to access domains over particular data domains. Accordingly, the updated security policy forwarded by the host server 410 may be implemented by the access components 512 617 620 to control access to data based upon data-type characteristics or data content characteristics.

In an embodiment, an access component 512 617 620 may assign a data object to a data domain based upon content such as an author or recipient of the object. For instance, a mail application may assign mail sent to a corporate address as belonging within the corporate domain and mail sent to a personal address as belonging in the public or common domain. The mail application may assign the mail by accessing a mail object, evaluate content fields or metadata of the mail object to identify a sender or recipient of the mail object. The mail application may further classify mail objects sent or received to a specific corporate mail domain as being within a corporate domain. Accordingly, the mail application may restrict future access to the mail assigned to the corporate domain to applications of an assigned access domain that are authorized to view data that falls within the corporate domain.

In an embodiment, an access component 512 617 620 may assign a data object to a data domain based upon content such as a time of data generation/capture, a location of the device or a combination of both factors. For instance, a photo application may capture a photograph and classify the data to the corporate domain if it is captured during business hours and/or the device is located at the corporate location. The same photo application may capture a photograph and classify the data to the public/common domain if the data is captured after business hours, on the weekend or at a user's home location.

In both instances, the security policy may set what permissions may be allowed, but the access components that control specific data types may assess different criteria based upon data content to apply the permissions appropriately to classify data as belonging to a particular data domain.

Where an updated security policy may be sent to the computing device 400, the access components 512 617 620 may be operative to apply the updated security policy at a time that data is requested by a requesting component 615. Accordingly, data may be classified and stored by the computing device 400 in association with an assigned data domain under an existing security policy. The computing device 400 may receive an updated security policy that may change access permissions based upon requesting component, access domain, data domain or data characteristics. The access components 512 617 620 may enforce the security policy at a time that data is requested by a requesting component 615 by identifying an access domain of the requesting domain and a data domain of the requested data based upon the updated security policy and determining whether to grant access the data by comparing the access domain and the data domain with the permissions specified in the updated security policy. The identifying the data domain may comprise evaluating one or more data characteristics of the requested data and assigning a data domain to the requested data at the time of request based on the one or more data characteristics and the updated security policy.

In an embodiment where the data may be stored in association with a data domain identifier assigned to the data at the time of storage, the identifying the data domain may comprise evaluating one or more data characteristics of the requested data wherein the one or more data characteristics may include both the data domain identifier associated with the requested data and other content of the data.

The access components 512 617 620 may evaluate the data characteristics by retrieving the associated data domain identifier and matching the retrieved data domain identifier with an assigned data domain specified in the updated security policy. Accordingly, data may be stored in association with a data domain specified in a security policy and yet access may be granted by the access component 512 617 620 based upon the assigned data domain specified in the updated security policy.

The access components 512 617 620 may further evaluate the data characteristics by retrieving both the data domain identifier and the other content and matching the retrieved data domain identifier and other content with an assigned data domain specified in the updated security policy. Accordingly, data may be stored in association with a data domain specified in one security policy and yet access may be granted by the access component 512 617 620 based upon the other content and an assigned data domain specified in the updated security policy.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. It will also be appreciated that although the embodiments herein have been directed generally to calendar events, similar systems and methods may be carried out in respect of other types of time or schedule-based user data.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method to control access to data stored on a data store of a computing device, the method comprising:
   receiving a request for data from a requesting component;
   identifying an assigned access domain of the requesting component;
   identifying an assigned data domain of the requested data, the data domain having been assigned to the requested data based on a comparison of one or more data characteristics of the requested data with one or more data classifications defined in a security policy;
   determining whether the requesting component is authorized to access the requested data by comparing one or more permissions specified in the security policy with each of the assigned access domain and the assigned data domain; and,
   if the assigned access domain is authorized to access the assigned data domain, providing access to the requested data.

2. The method of claim 1 wherein the identifying the assigned data domain of the requested data comprises evaluating one or more data characteristics of the requested data and identifying the assigned data domain based on the one or more data characteristics and the security policy.

3. The method of claim 2 wherein the one or more data characteristics comprises a data domain identifier associated with the requested data, and the evaluating comprises retrieving the data domain identifier and matching the retrieved data domain identifier with a corresponding assigned data domain specified in the security policy.

4. The method of claim 2 wherein the requested data comprises a data object, and wherein the evaluating one or more data characteristics comprises accessing the data object and analysing the data object to evaluate a content of the data object and comparing the content with data classifications defined in the security policy to identify the assigned data domain.

5. The method of claim 1 wherein the identifying the assigned access domain of the requesting component comprises receiving an access domain identifier from the requesting component and matching the received access domain identifier with a corresponding assigned access domain specified in the security policy to identify the assigned access domain.

6. The method of claim 1 wherein before receiving the request, classifying the requested data to assign a data domain by:
   evaluating data characteristics of the requested data;
   comparing the data characteristics with data classifications defined in the security policy to assign a data domain; and,
   storing the requested data in the data store associated with the data domain.

7. The method of claim 6 wherein the identifying the assigned data domain comprises evaluating the data domain stored in association with the requested data, and comparing the data domain with data classifications defined in the security policy to identify the assigned data domain.

8. The method of claim 1 further comprising: the computing device receiving an updated security policy from a server over a network connection and the computing device replacing the security policy with the updated security policy such that operations on the computing device that were based on the security policy become based upon the updated security policy.

9. A computing device operative to control access to data stored on a data store of the device, the computing device comprising:
   a processing unit in communication with the data store;
   a requesting component operative on the device to request data stored in the data store;
   an access component operative on the device to:
      control access to data stored in the data store;
      receive one or more requests for data from the requesting component;
      identify an assigned access domain of the requesting component;
      identify an assigned data domain of the requested data, the data domain having been assigned to the requested data based on a comparison of one or more data characteristics of the requested data with one or more data classifications defined in a security policy;
      determine whether the requesting component is authorized to access the requested data by comparing one or more permissions specified in the security policy with each of the assigned access domain and the assigned data domain; and,
      provide access to the requested data if the assigned access domain is authorized to access the assigned data domain.

10. The computing device of claim 9 wherein the access component is operative to identify the assigned data domain of the requested data by evaluating one or more data characteristics of the requested data and identifying the assigned data domain based on the one or more data characteristics and the security policy.

11. The computing device of claim 10 wherein the one or more data characteristics comprises a data domain identifier associated with the requested data, and the access component is operative to evaluate by retrieving the data domain identifier and matching the retrieved data domain identifier with a corresponding assigned data domain specified in the security policy.

12. The computing device of claim 10 wherein the requested data comprises a data object and wherein the access component is operative to access the data object accessible to the access component and to evaluate the one or more data characteristics by accessing the data object and analysing the data object to evaluate a content of the data object and compare the content with data classifications defined in the security policy to identify the assigned data domain.

13. The computing device of claim 9 wherein the access component is operative to identify the assigned access domain of the requesting component when the access component receives an access domain identifier from the requesting component by matching the received access domain identifier with a corresponding assigned access domain specified in the security policy to identify the assigned access domain.

14. The computing device of claim 9 wherein the access component is operative to classify the requested data to assign a data domain before the access component receives the request, by:
   evaluating data characteristics of the requested data;
   comparing the data characteristics with data classifications specified in the security policy to assign a data domain; and,
   storing the requested data in the data store associated with the data domain.

15. The computing device of claim 14 wherein the access component is operative to identify the assigned data domain by evaluating the data domain stored in association with the requested data, and comparing the data domain with data classifications defined in the security policy to identify the assigned data domain.

16. The computing device of claim 9 further comprising a network communications subsystem, the computing device operative to receive an updated security policy from a server through the network communications subsystem, and the access component is further operative to replace the security policy with the updated security policy such that operations of the access component that were based on the security policy become based upon the updated security policy.

17. The method of claim 1, wherein the one or more data characteristics of the requested data comprise an identity of a device from which the requested data originated.

18. The method of claim 1, wherein the one or more data characteristics of the requested data comprise a source of the requested data.

19. The method of claim 1, wherein the requested data comprises a data object, and wherein the one or more data characteristics of the requested data comprise an author or recipient of the data object.

20. The method of claim 1, wherein the one or more data characteristics of the requested data comprise at least one of a time the requested data was generated, a time the requested data was captured, or a location of the computing device.

21. The method of claim 8, wherein a new data domain is associated to the requested data by
evaluating one or more data characteristics of the requested data,
comparing the one or more data characteristics with data classifications defined in the updated security policy to assign the data domain to the requested data, and
storing the requested data, with the data domain assigned to the data, in the data store.

22. The method of claim 1, wherein the one or more data classifications specify a source of the requested data.

23. The method of claim 1, wherein the one or more data classifications specify a data type of the requested data.

24. The method of claim 1, wherein the one or more data classifications specify a user classification.

25. The method of claim 1, wherein the one or more data classifications are associated with keywords specified in a content of the requested data.

26. The computing device of claim 9, wherein the one or more data characteristics of the requested data comprise an identity of a device from which the requested data originated.

27. The computing device of claim 9, wherein the one or more data characteristics of the requested data comprise a source of the requested data.

28. The computing device of claim 9, wherein the requested data comprises a data object, and wherein the data characteristics of the requested data comprise an author or recipient of the data object.

29. The computing device of claim 9, wherein the one or more data characteristics of the requested data comprise at least one of a time the requested data was generated, a time the requested data was captured, or a location of the computing device.

30. The computing device of claim 16, wherein a new data domain is associated to the requested data by
evaluating one or more data characteristics of the requested data,
comparing the one or more data characteristics with data classifications defined in the updated security policy to assign the data domain to the requested data, and
storing the requested data, with the data domain assigned to the data, in the data store.

31. The computing device of claim 9, wherein the one or more data classifications specify a source of the requested data.

32. The computing device of claim 9, wherein the one or more data classifications specify a data type of the requested data.

33. The computing device of claim 9, wherein the one or more data classifications specify a user classification.

34. The computing device of claim 9, wherein the one or more data classifications are associated with keywords specified in a content of the requested data.

35. A computer-readable medium comprising instructions, which when executed by a processor of a computing device cause the processor to perform instructions for controlling access to data stored on a data store of a computing device, the instructions comprising instructions for:
receiving a request for data from a requesting component;
identifying an assigned access domain of the requesting component;
identifying an assigned data domain of the requested data, the data domain having been assigned to the requested data based on a comparison of one or more data characteristics of the requested data with one or more data classifications defined in a security policy;
determining whether the requesting component is authorized to access the requested data by comparing one or more permissions specified in the security policy with each of the assigned access domain and the assigned data domain; and,
if the assigned access domain is authorized to access the assigned data domain, providing access to the requested data.

* * * * *